United States Patent
Ou et al.

(10) Patent No.: US 9,775,414 B2
(45) Date of Patent: Oct. 3, 2017

(54) PORTABLE ELECTRONIC DEVICE

(71) Applicant: HTC Corporation, Taoyuan, Taoyuan County (TW)

(72) Inventors: Shih-Hsun Ou, Taoyuan (TW); Chun-Ta Huang, Taoyuan (TW); Ernest Euan Tien, Taoyuan (TW)

(73) Assignee: HTC CORPORATION, Taoyuan ( * ) Notice: Subject to any disclaimer, the term of this patent is extended or adjusted under 35 U.S.C. 154(b) by 240 days.

(21) Appl. No.: 14/533,725

(22) Filed: Nov. 5, 2014

(65) Prior Publication Data

US 2016/0120272 A1   May 5, 2016

(51) Int. Cl.

| | |
|---|---|
| *G04B 37/14* | (2006.01) |
| *A44C 5/12* | (2006.01) |
| *A44C 5/14* | (2006.01) |
| *A44C 5/16* | (2006.01) |
| *A44C 5/22* | (2006.01) |
| *G06F 1/16* | (2006.01) |

(52) U.S. Cl.
CPC .................. *A44C 5/12* (2013.01); *A44C 5/14* (2013.01); *A44C 5/16* (2013.01); *A44C 5/22* (2013.01); *G04B 37/1486* (2013.01); *G06F 1/163* (2013.01)

(58) Field of Classification Search
CPC ......... G04B 17/14; A44C 5/0007; A44C 5/16; A44C 5/22; A44C 5/12; G06F 1/163
USPC ..................... 224/174, 179, 219; 361/679.03
See application file for complete search history.

(56) References Cited

U.S. PATENT DOCUMENTS

| 843,243 | A | * | 2/1907 | Wallenthin | ............. A44C 13/00 63/10 |
|---|---|---|---|---|---|
| 2,765,108 | A | * | 10/1956 | Doerwald | ............. G04B 37/12 224/174 |
| 6,535,376 | B2 | | 3/2003 | Fujita et al. | |
| 6,681,014 | B1 | * | 1/2004 | Ghassabian | ............ H04B 1/385 379/433.1 |
| 7,209,114 | B2 | | 4/2007 | Radley-Smith | |
| 7,353,048 | B2 | * | 4/2008 | Pontoppidan | ........... G06F 1/163 16/256 |
| 7,397,437 | B2 | * | 7/2008 | Hasumi | ............. G04B 37/1486 368/281 |
| 7,618,260 | B2 | | 11/2009 | Daniel et al. | |

(Continued)

FOREIGN PATENT DOCUMENTS

| CN | 1366218 A | 8/2002 |
|---|---|---|
| CN | 1427602 A | 7/2003 |

(Continued)

*Primary Examiner* — Amy Cohen Johnson
*Assistant Examiner* — Daniel Wicklund
(74) *Attorney, Agent, or Firm* — Birch, Stewart, Kolasch & Birch, LLP (57) ABSTRACT

A portable electronic device is provided, including a main body, a C-shaped member, and a hinge module, wherein the main body includes a display surface and the C-shaped member includes an opening. The hinge module pivotally connects the main body with the C-shaped member. When the main body is situated in a first position, the main body covers the opening. When the main body rotates from the first position around an axis to a second position relative to the C-shaped member via the hinge module, the main body is away from the opening. An acute angle is formed between the axis and the display surface.

18 Claims, 9 Drawing Sheets

(56) References Cited

U.S. PATENT DOCUMENTS

| | | | | |
|---|---|---|---|---|
| 9,273,718 | B2* | 3/2016 | Fathi | F16B 45/02 |
| 2002/0025056 | A1* | 2/2002 | Fujita | A44C 5/0015 |
| | | | | 381/364 |
| 2002/0104192 | A1* | 8/2002 | Iguchi | A44C 5/12 |
| | | | | 16/386 |
| 2002/0104200 | A1* | 8/2002 | Iguchi | A44C 5/0007 |
| | | | | 24/265 WS |
| 2003/0116596 | A1* | 6/2003 | Terasawa | A44C 5/0007 |
| | | | | 224/179 |
| 2004/0029530 | A1* | 2/2004 | Noguchi | H04R 5/023 |
| | | | | 455/23 |
| 2005/0272486 | A1* | 12/2005 | Kim | G04B 37/1486 |
| | | | | 455/575.3 |
| 2006/0203621 | A1* | 9/2006 | Brodmann | A44C 5/0092 |
| | | | | 368/281 |
| 2010/0078541 | A1* | 4/2010 | Fathi | A44B 15/005 |
| | | | | 248/339 |
| 2014/0245783 | A1 | 9/2014 | Proud et al. | |
| 2014/0362544 | A1* | 12/2014 | Han | G04G 17/06 |
| | | | | 361/749 |
| 2015/0212541 | A1* | 7/2015 | Lu | G04G 17/02 |
| | | | | 361/679.03 |
| 2015/0277489 | A1* | 10/2015 | Lin | G06F 1/163 |
| | | | | 361/679.03 |
| 2016/0018790 | A1* | 1/2016 | Su | G04G 17/02 |
| | | | | 368/316 |

FOREIGN PATENT DOCUMENTS

| | | |
|---|---|---|
| CN | 200997544 Y | 12/2007 |
| CN | 201063657 Y | 5/2008 |
| CN | 102232150 B | 7/2013 |
| CN | 203826729 U | 9/2014 |

* cited by examiner

PORTABLE ELECTRONIC DEVICE

BACKGROUND OF THE INVENTION

Field of the Invention

The application relates in general to an electronic device, and in particular, to a portable electronic device.

Description of the Related Art

With the progress of technology, a lot of portable electronic devices have been developed. Some portable electronic devices may have annular appearances to be worn on the wrist or arm (such as smart watches). The whole or a part of the annular portable electronic devices are generally made of flexible material, such that the wrist or arm can be put therethrough. However, the loosening of the portable electronic devices from the wrist or arm may easily occur due to elastic fatigue after long-term usage, such that the portable electronic devices become inconvenient to wear.

BRIEF SUMMARY OF INVENTION

To address the deficiency of conventional electronic products, an embodiment of the invention provides a portable electronic device, comprising a main body, a C-shaped member, and a hinge module, wherein the main body includes a display surface and the C-shaped member includes an opening. The hinge module pivotally connects the main body at the C-shaped member. When the main body is situated in a first position, the main body covers the opening. When the main body rotates from the first position around an axis to a second position relative to the C-shaped member via the hinge module, the main body is away from the opening. An acute angle is formed between the axis and the display surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the portable electronic devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
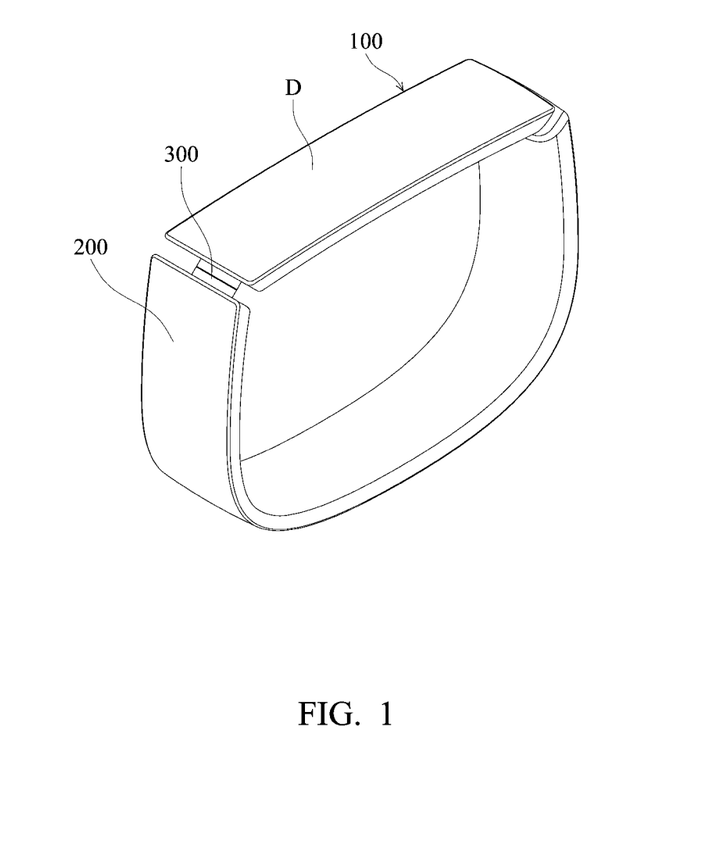
FIG. 1 is a schematic diagram of a portable electronic device according to an embodiment of the invention.

Referring to FIG. 1, a portable electronic device according to an embodiment of the invention can be a smart watch, primarily comprising a main body 100, a C-shaped member 200, and a hinge module 300. The hinge module 300 has a cylinder structure and pivotally connects the main body 100 with the C-shaped member 200. In this embodiment, the main body 100 can be a display module (LCD display, for example), and a plurality of electronic elements (not shown) are disposed in the C-shaped member 200, such as a processor and an energy storage unit (battery). The electronic elements electrically connect to the main body 100 via the hinge module 300.

Figure 2A:
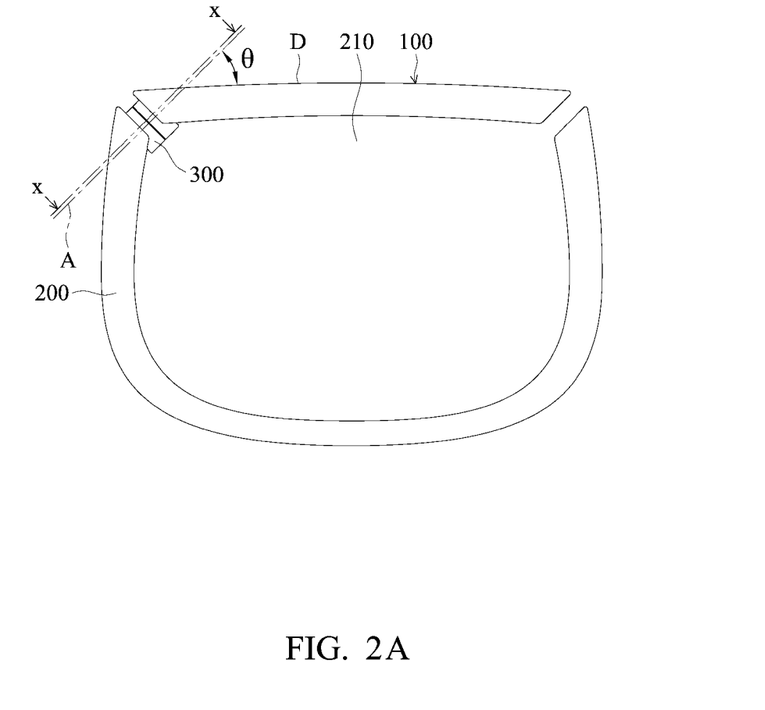
FIG. 2A is a schematic diagram representing a main body situated in a first position.
Figure 2B:
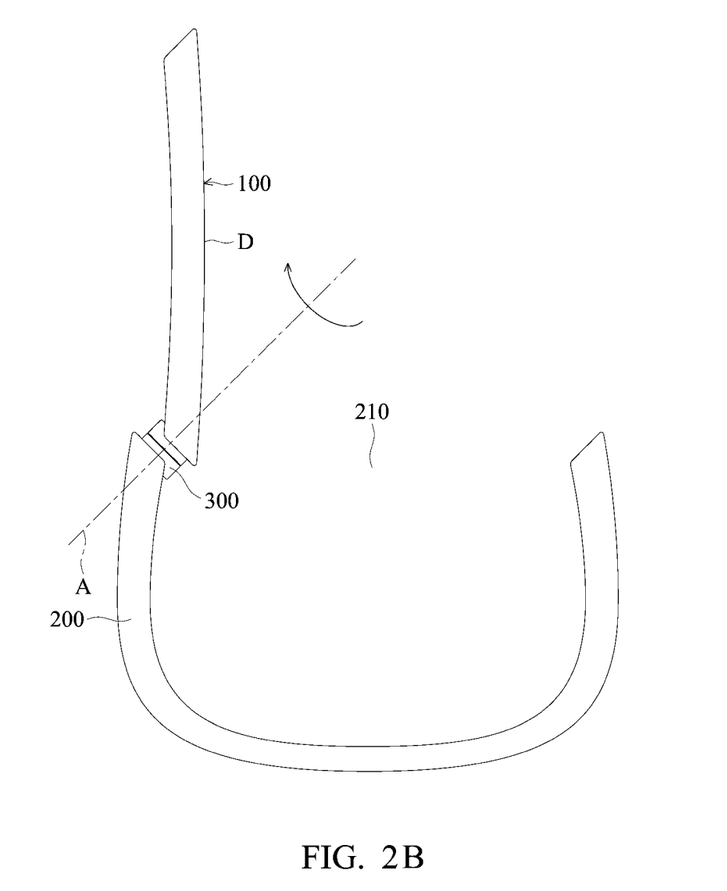
FIG. 2B is a schematic diagram representing the main body rotating from the first position around an axis to the second position.

Referring to FIGS. 2A and 2B, the C-shaped member 200 comprises an opening 210. When the main body 100 is situated at a first position (FIG. 2A), the main body 100 substantially covers the opening 210, and a display surface D of the main body 100 faces away from the opening 210 for convenient viewing. As shown in FIG. 2B the main body 100 can rotate around an axis A relative to the C-shaped member 200 through the hinge module 300, and move from the first position to a second position (FIG. 2B). When the main body 100 is situated at the second position, the opening 210 is not covered by the main body 100, and the user put the wrist in the C-shaped member 200 through the opening 210. Subsequently, the main body 100 can rotate from the second position around the axis A to the first position to complete the wearing process. It should be noted that an acute angle θ is formed between the axis A and the display surface D (FIG. 2A), wherein the acute angle θ is about 30-80 degrees. Thus, the user can easily rotate the main body 100 to conveniently wear or take off the portable electronic device.

In this embodiment, the main body 100 has the functions of an electronic wallet and a personal digital assistant (PDA). Specifically, when the main body 100 rotates from the first position (FIG. 2A) around the axis A to the second position (FIG. 2B), the processor transfers a disable signal to the main body 100, and the main body 100 turns off the power or executes a logout instruction. Conversely, when the main body 100 rotates from the second position around the axis A to the first position, the processor transfers an enable signal to the main body 100, and the display surface D of the main body 100 shows a login screen. At this time, the user has to provide identification and authentication information (enter an account number and password or identify by a fingerprint, for example) to log in and use the function of electronic wallet or PDA. In another embodiment, the main body 100 comprises an identification unit and a wireless communication module (not shown), wherein the identification unit can be a fingerprint identification module. When the main body 100 rotates from the second position around the axis A to the first position, the processor automatically executes an identification program to identify the authority level of the user by the identification unit. If the authority level of the user identified by the identification unit is not acceptable, the processor can transmit a warning signal via the wireless communication module. If the authority level of the user is accepted by the identification unit, the processor automatically executes a login program. After the processor executes the login program, the wireless communication module is enabled, and the processor can execute the function of electronic wallet or PDA via the wireless communication module. In this embodiment, the user does not need to enter the information through the display surface D to login. Thus, the exposure of personal information when the portable electronic device is lost can be avoided, such that the protection of the personal information can be achieved. Furthermore, when the main body 100 rotates from the second position to the first position, the display surface D immediately shows the login screen, or logs in directly, after the authority level of the user is accepted by the identification unit. Thus, operating time can be reduced for a convenient and quick login.

Figure 3A:
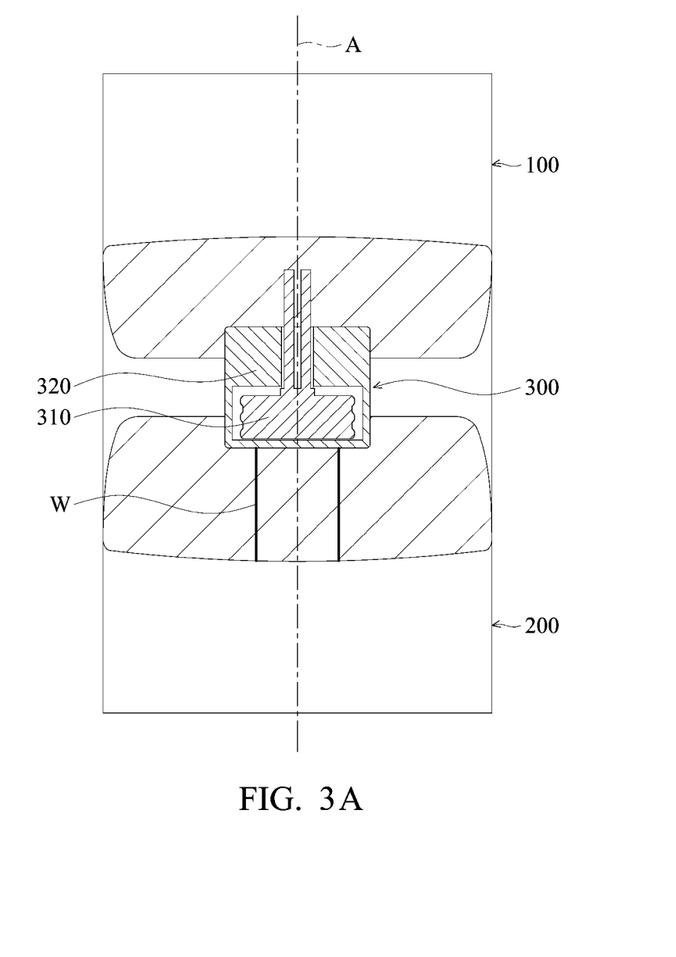
FIG. 3A is a cross-sectional view taken along the line x-x in FIG. 2A.
Figure 3B:
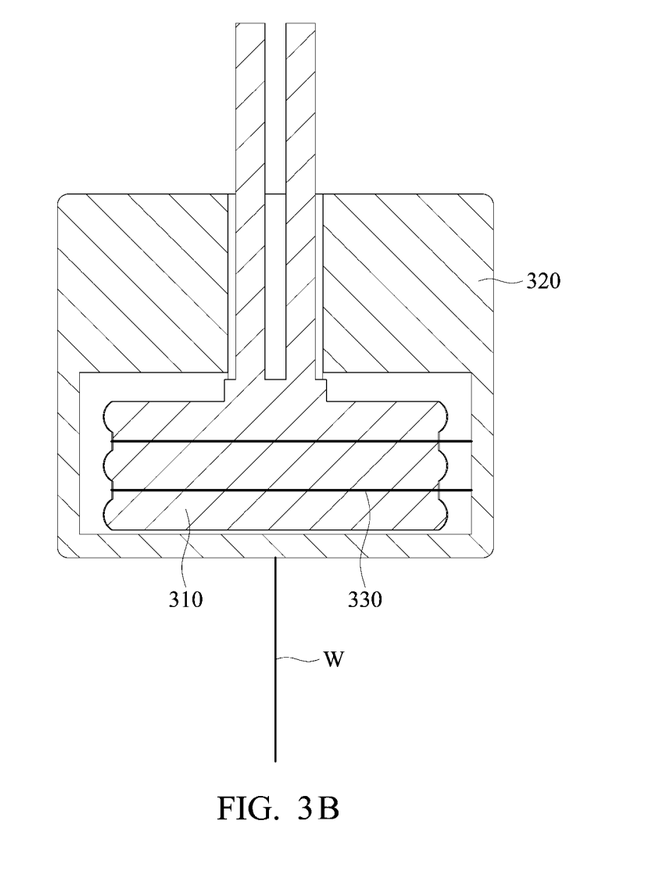
FIG. 3B is a schematic diagram representing a first member slidably connecting to a brush wire.

Referring to FIGS. 3A and 3B, a sliding mechanism is disposed in the hinge module 300, wherein the sliding mechanism comprises a first member 310, a second member 320, and a brush wire 330. The first member 310 is fixed to the main body 100, and the second member 320 is fixed to the C-shaped member 200 and pivotally connected to the main body 100. The first member 310 is rotatable around the axis A relative to the second member 320. In this embodiment, the first and second members 310 and 320 are made of a conductive material (metal or graphite, for example). The second member 320 electrically connects to the electronic elements in the C-shaped member 200 by a wire W (FIG. 3B). As shown in FIG. 3B, an end of the brush wire 330 is fixed to the second member 320, and the first member 310 slidably contacts to the brush wire 330. Thus, the main body 100 and the electronic elements in the C-shaped member 200 can transfer the electronic signals therebetween through the brush wire 330 and the wire W. When the main body 100 rotates from the first position around the axis A to the second position, the first member 310 rotates around the axis A relative to the second member 320. The brush wire 330 continuously connects to the first and second members 310 and 320 during the rotation, such that the main body 100 can be continuously electrically connected to the electronic elements in the C-shaped member 200.

In this embodiment, the second member 320 has a hollow structure, and the first member 310 has a T-shaped cross section and is accommodated in the second member 320. The axis A is located at the central position of the hinge module 300 and passes through the main body 100, the C-shaped member 200, and the hinge module 300 (FIG. 2A). In some embodiments, the brush wire 330 and the second member 320 can also be integrally formed in one piece by molding.

It should be noted that the first and second members 310 and 320 may electrically connect to each other through a plurality of contacts, wherein several electronic elements corresponding to the contacts may be disposed in the C-shaped member 200. Thus, the inner space of the C-shaped member 200 can be occupied effectively, and the thickness of the main body 100 can be reduced.

Figure 4:
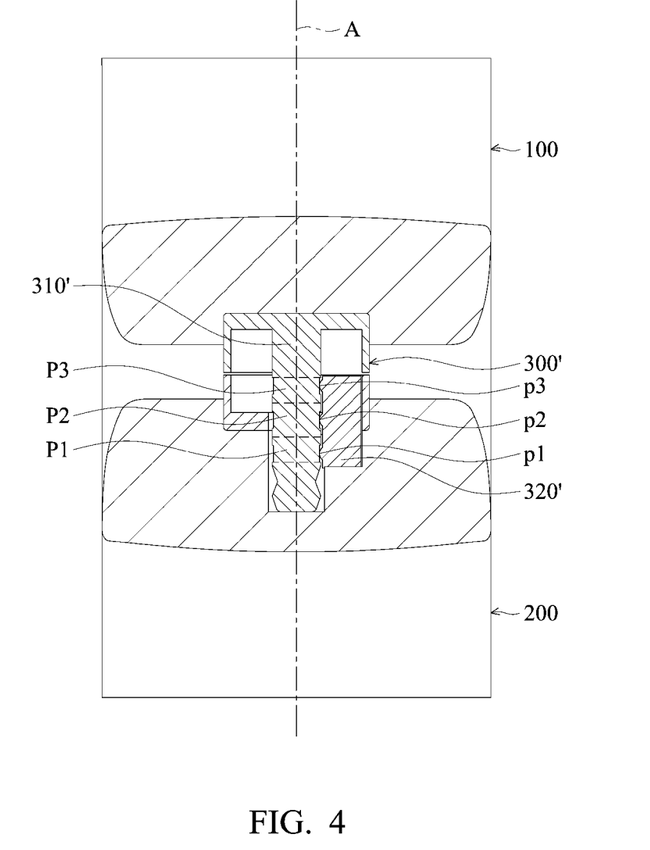
FIG. 4 is a schematic diagram representing a hinge module pivotally connecting a main body with a C-shaped member according to another embodiment of the invention.

As shown in FIG. 4, a hinge (nodule 300' according to another embodiment of the invention comprises a first member 310' and a second member 320'. The first member 310' is fixed to the main body 100, and the second member 320' is fixed to the C-shaped member 200. The first member 310' is rotatable around the axis A relative to the second member 320'. In this embodiment, the first member 310' is a plug (jack plug, for example) that comprises a plurality of electrical connection portions P1, P2, and P3. The second member 320' forms a socket and comprises a plurality of conductive contacts p1, p2, and p3. When the main body 100 is joined to the C-shaped member 200 through the hinge module 300', the electrical connection portions P1, P2, and P3 respectively contact the conductive contacts p1, p2, and p3, such that the main body 100 and the electronic elements in the C-shaped member 200 electrically connect to each other by the first and second members 310' and 320'. With the cylinder structure of the first member 310', the electrical connection portions P1, P2, and P3 of the first member 310' remain in contact with the conductive contacts p1, p2, and p3 of the second member 320' during rotation of the main body 100 from the first position around the axis A to the second position.

It should be noted that since the numbers of the signals transferred between the electrical connection portions P1, P2, and P3 and the conductive contacts p1, p2, and p3 is limited, the processor may be disposed in the main body 100, and the electronic element in the C-shaped member 200 may only include a battery. Furthermore, as the first member 310' is the detachable plug, the main body 100 can be separated from the C-shaped member 200 by pulling out the plug for easy inspection and maintenance. In some embodiments, the second member 320' can be a plug having a plurality of electrical connection portions, and the first member 310' may form a socket and have a plurality of conductive contacts corresponding to the electrical connection portions.

Figure 5A:
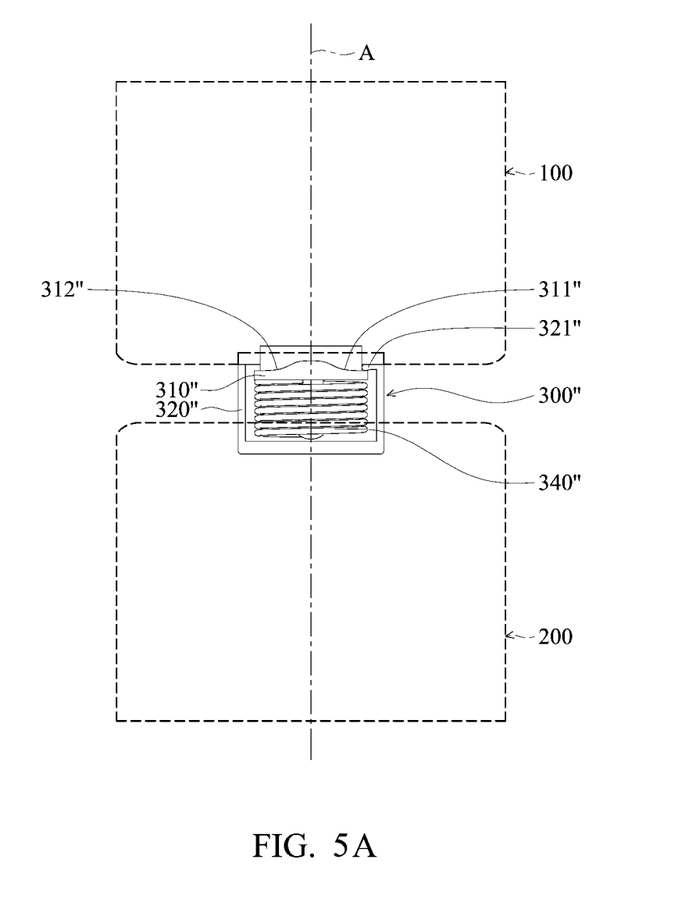
FIG. 5A is a schematic diagram representing a hinge module pivotally connecting a main body with a C-shaped member according to another embodiment of the invention.
Figure 5B:
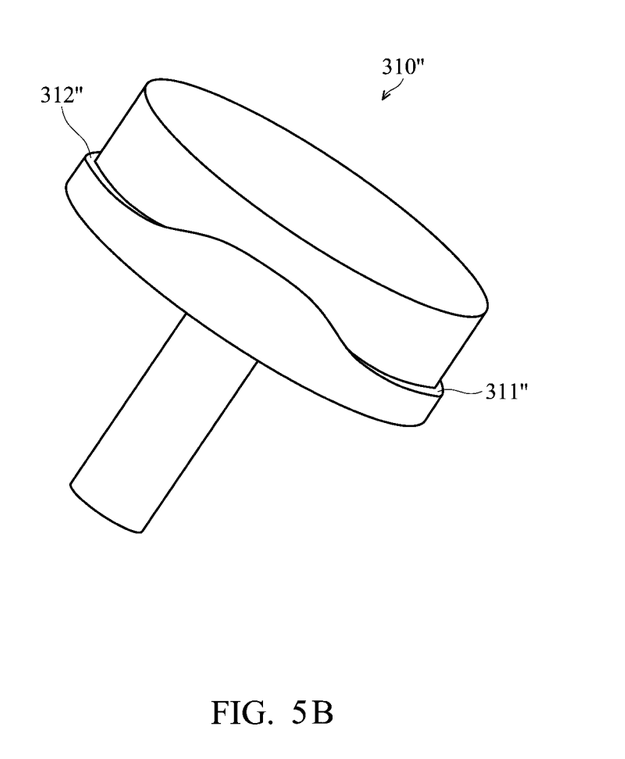
FIG. 5B is a schematic diagram of the first member in FIG. 5A.

If the processor and the energy storage unit are disposed in the main body 100, the main body 100 may not electrically connect to the C-shaped member 200. Referring to FIGS. 5A and 5B, a hinge module 300" according to another embodiment comprises a first member 310", a second member 320", and an elastic element 340". The first member 310" is fixed to the main body 100, and the second member 320" is fixed to the C-shaped member 200. The first member 310" is rotatable around the axis A relative to the second member 320". The elastic element 340" (a spring, for example) connects to the first and second members 310" and 320". Specifically, a first recess 311" and a second recess 312" are formed on the outer side of the first member 310", and a protrusion 321" is formed on the inner side of the second member 320". When the main body 100 is situated in the first position, the elastic element 340" can provide an elastic force to position the protrusion 321" to be accommodated in the first recess 311". When the main body 100 rotates from the first position around the axis A to the second position, the protrusion 321" can slide from the first recess 311' to the second recess 312", and the elastic element 340" can provide an elastic force to position the protrusion 321" to be accommodated in the second recess 312". Thus, the main body 100 can be alternatively fixed to the first or second position. However, if the protrusion 321" is formed on the first member 310", and the first and second recesses 311" and 312" are formed on the second member 320", the same functions can also be achieved.

Figure 6:
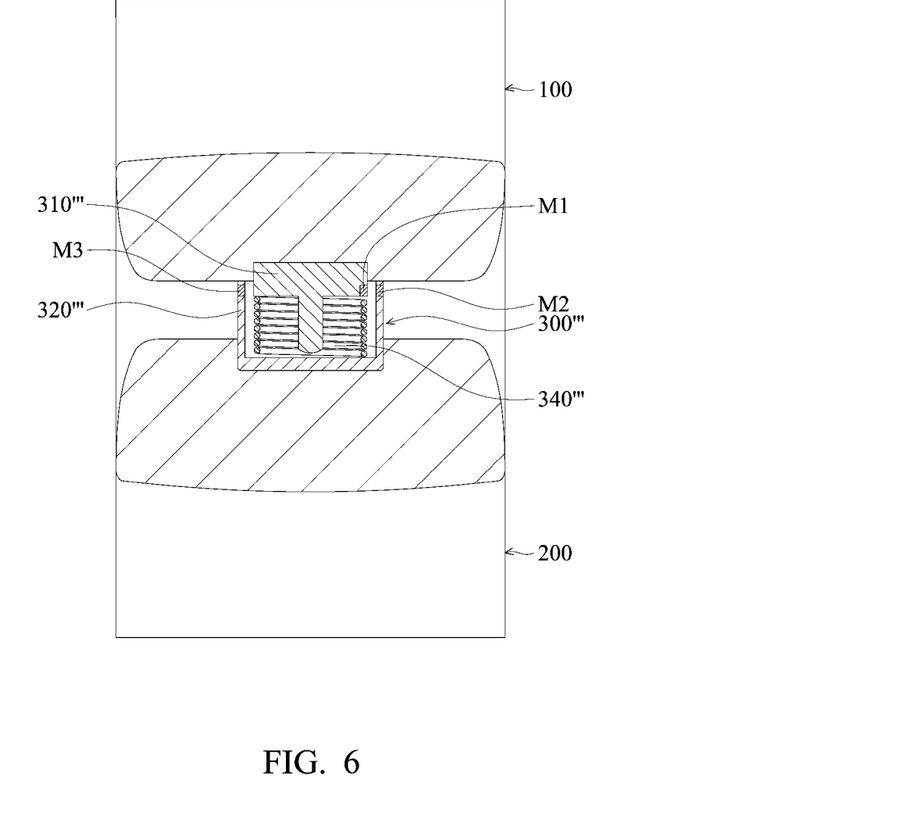
FIG. 6 is a schematic diagram representing a hinge module pivotally connecting a main body with a C-shaped member according to another embodiment of the invention.

Referring to FIG. 6, a hinge module 300''' according to another embodiment comprises a first member 310''', a second member 320''', an elastic element 340''', a first magnetic element M1, and a second magnetic element M2. The first member 310''' is fixed to the main body 100, and the second member 320''' is fixed to the C-shaped member 200. The first member 310''' is rotatable around the axis A relative to the second member 320'''. The elastic element 340''' (a spring, for example) connects to the first and second members 310''' and 320'''. Specifically, the first magnetic element M1 is disposed on the first member 310''', and the second magnetic element M2 is disposed on the second member 320'''. When the main body 100 is situated in the first position, the first magnetic element M1 is adjacent to and oriented toward the second magnetic element M2, such that the main body 100 can be fixed in the first position by the magnetic attraction force between the first and second magnetic elements M1 and M2. In this embodiment, the hinge module 300''' further comprises a third magnetic element M3 disposed on the second member 320'''. The first magnetic element M1 is disposed between the second and third magnetic elements M2 and M3. When the main body 100 rotates from the first position around the axis A to the second position, the first magnetic element M1 is adjacent to and oriented toward the third magnetic element M3, such that the main body 100 can be fixed in the second position by the magnetic attraction three between the first and third magnetic elements M1 and M3.

It should be noted that the aforementioned positioning structure (such as the protrusion 321", the first and second recesses 311" and 312" in FIG. 5A, or the first, second, and third magnetic elements M1, M2, and M3 in FIG. 6) can also be applied to the hinge modules 300 and 300' shown in FIGS. 3A-4. Moreover, the main body 100 and the C-shaped member 200 in the aforementioned embodiments can be made of a rigid material (plastic or metal, for example), such that the main body 100 can easily rotate between the first and second positions. In some embodiments, a ball bearing or a screw thread can be applied between the first and second members, such that the first member can smoothly rotate relative to the second member.

In summary, a portable electronic device is provided with an acute angle formed between the axis of the hinge module and the display surface of the main body, such that the user can easily operate the portable electronic device. Furthermore, when the main body rotates between the first and second positions, the processor can transmit a disable/enable signal to the main body, such that the protection of personal information can be achieved, and the convenience and safety during usage of the portable electronic device can also be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

Use of ordinal terms such as "first" "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A portable electronic device, comprising:
   a main body, comprising a display surface;
   a C-shaped member, comprising an opening;
   a hinge module, pivotally connecting the main body with the C-shaped member and comprising a sliding mechanism, wherein the sliding mechanism comprises a first member connected to the main body and a second member connected to the C-shaped member, and the first member is pivotally connected to the second member and is slidable relative to the second member; and
   a processor;
   wherein when the main body is situated in a first position, the main body covers the opening, and when the main body rotates from the first position around an axis to a second position relative to the C-shaped member via the hinge module, the processor transmits a disable signal to the main body and the main body is away from the opening, wherein an acute angle is formed between the axis and the display surface, wherein during the rotation of the main body relative to the C-shaped member, the relative position between the first member and the second member is maintained.

2. The portable electronic device as claimed in claim 1, wherein the hinge module has a cylinder structure.

3. The portable electronic device as claimed in claim 2, wherein the axis passes through the C-shaped member, the cylinder structure, and the main body.

4. The portable electronic device as claimed in claim 1, wherein the acute angle is 30-80 degrees.

5. The portable electronic device as claimed in claim 1, wherein the portable electronic device further comprises an electronic element disposed in the C-shaped member, and the main body electrically connects to the electronic element through the hinge module.

6. The portable electronic device as claimed in claim 1, wherein when the main body rotates from the second position around the axis to the first position relative to the C-shaped member, the processor transmits a enable signal to the main body.

7. The portable electronic device as claimed in claim 1, wherein the portable electronic device further comprises an electronic element disposed in the C-shaped member, the first member and the second member comprise conductive material, and the first member slidably contacts the second member, wherein the main body electrically connects to the electronic element via the first and second members.

8. The portable electronic device as claimed in claim 7, wherein the sliding mechanism further comprises a brush wire electrically connecting the first member with the second member.

9. The portable electronic device as claimed in claim 8, wherein the first member comprises a T-shaped cross section, and the electronic element comprises a processor or a battery.

10. The portable electronic device as claimed in claim 7, wherein the first member comprises a plug having a plurality of electrical connection portions, and the second member comprises a plurality of conductive contacts, wherein the electrical connection portions slidably connect to the conductive contacts.

11. The portable electronic device as claimed in claim 7, wherein the second member comprises a plug having a plurality of electrical connection portions, and the first member comprises a plurality of conductive contacts, wherein the electrical connection portions slidably connect to the conductive contacts.

12. The portable electronic device as claimed in claim 1, wherein the first member is accommodated in the second member.

13. The portable electronic device as claimed in claim 1, wherein the axis passes through the first and second members, and when the main body rotates around the axis relative to the C-shaped member, the first member rotates around the axis relative to the second member.

14. The portable electronic device as claimed in claim 1, wherein the sliding mechanism further comprises an elastic element connecting the first member and the second member, the first member comprises a first recess and a second recess, and the second member comprises a protrusion, wherein when the main body is situated in the first position, the protrusion is accommodated in the first recess, and when the main body rotates from the first position around the axis to the second position relative to the C-shaped member through the hinge member, the protrusion slides from the first recess to the second recess.

15. The portable electronic device as claimed in claim 14, wherein the elastic element comprises a spring.

16. The portable electronic device as claimed in claim 1, wherein the sliding mechanism further comprises an elastic element connecting the first member and the second member, the first member comprises a protrusion, and the second member comprises a first recess and a second recess, wherein when the main body is situated in the first position, the protrusion is accommodated in the first recess, and when the main body rotates from the first position around the axis to the second position relative to the C-shaped member through the hinge member, the protrusion slides from the first recess to the second recess.

17. The portable electronic device as claimed in claim 16, wherein the elastic element comprises a spring.

18. The portable electronic device as claimed in claim 1, wherein the sliding mechanism further comprises a first magnetic element and a second magnetic element, the first magnetic element is disposed on the first member, and the second magnetic element is disposed on the second member, wherein when the main body is situated in the first position, the first magnetic element is adjacent to the second magnetic element to provide a magnetic attraction force therebetween to fix the main body in the first position.

* * * * *